US010162807B2

(12) United States Patent
Carlen et al.

(10) Patent No.: US 10,162,807 B2
(45) Date of Patent: Dec. 25, 2018

(54) ATTACHMENT MARKUP AND MESSAGE TRANSMISSION

(71) Applicant: Apple Inc., Cupertino, CA (US)

(72) Inventors: Conrad R. Carlen, Burlingame, CA (US); Terence D. Blanchard, San Jose, CA (US); Patrick L. Coffman, San Francisco, CA (US); Alexandre R. Moha, Los Altos, CA (US); Evan S. Murphy, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 14/291,956

(22) Filed: May 30, 2014

(65) Prior Publication Data

US 2015/0347368 A1     Dec. 3, 2015

(51) Int. Cl.
*G06F 17/24*     (2006.01)
*H04L 12/58*     (2006.01)

(52) U.S. Cl.
CPC .......... *G06F 17/241* (2013.01); *H04L 51/08* (2013.01)

(58) Field of Classification Search
CPC .............................. G06F 17/241; H04L 51/08
USPC .......................................................... 715/230
See application file for complete search history.

(56) References Cited

U.S. PATENT DOCUMENTS

| 8,271,893 | B1 * | 9/2012 | Tighe | 345/619 |
| 2004/0268246 | A1 * | 12/2004 | Leban | G06F 17/2247 715/239 |
| 2006/0075041 | A1 * | 4/2006 | Antonoff | H04L 67/28 709/206 |
| 2012/0284639 | A1 * | 11/2012 | Yuniardi | G06Q 10/00 715/752 |
| 2014/0019843 | A1 * | 1/2014 | Schmidt | G06F 17/241 715/230 |

OTHER PUBLICATIONS

Peter Krogh, "Parametric Image Editing", Nov. 16, 2009, dpbestflow.org, <http://www.dpbestflow.org/image-editing/parametric-image-editing>.*
Peter Krogh, "Metadata Handling", Mar. 16, 2010, dpbestflow.org, <http://dpbestflow.org/metadata/metadata-handling>.*
"6 Reasons Why You Should Stop Using Desktop Email Clients in Favour of Web-Based Options", Alcorn, makeuseof.com, <http://www.makeuseof.com/tag/stop-desktop-email-clients-stop-opinion/>, Jan. 20, 2012.*
"Secure email with encrypted PDF, ZIP, Word or Excel," EncOffice, <http://www.oraxcel.com/projects/encoffice/help/secure_email.html>, Mar. 25, 2008.*

(Continued)

*Primary Examiner* — Stephen S Hong
*Assistant Examiner* — Broderick C Anderson
(74) *Attorney, Agent, or Firm* — Dickinson Wright RLLP (57) ABSTRACT

A technique is provided for editing an attachment included in an email message. The attachment is displayed within a message body of the email message and can be edited directly within the message body. Specifically, the technique involves launching a markup application that generates an editable version of the attachment within the message body. The markup application allows a user to make edits to the editable version of the attachment without leaving the email message.

20 Claims, 8 Drawing Sheets

(56) References Cited

OTHER PUBLICATIONS

"What Is an API & What Are They Good for?," Kashyap, makeuseof. com, <http://www.makeuseof.com/tag/api-good-technology-explained/>, Aug. 24, 2010.*

"Working with File Attachments"; IBM Knowledge Center; <http://www.ibm.com/support/knowledgecenter/SSKTWP_8.0.1/com.ibm.notes.help.doc/DOC/H_USING_FILE_ATTACHMENTS_IN_A_DOCUMENT_OVER.html>.*

"IBM Notes"; Wikipedia; <https://web.archive.org/web/20130609031946/http://en.wikipedia.org/wiki/IBM_Notes>; published prior to Jun. 9, 2013.*

"Reduce the Size of Pictures and Attachments in Outlook email messages"; Microsoft; <https://support.office.com/en-us/article/reduce-the-size-of-pictures-and-attachments-in-outlook-email-messages-d0b6b6bf-3b08-4dad-a01c-533719d1c005#ID0EABAAA=Office_2010_-_2013>; (Year: 2016).*

\* cited by examiner

ATTACHMENT MARKUP AND MESSAGE TRANSMISSION

FIELD

The described embodiments set forth a technique for annotating and/or marking attachments in electronic messages.

BACKGROUND

People in most organizations communicate with one another by exchanging electronic messages (e.g., electronic mail (email) messages, text messages, instant messages, etc.). Generally, a sender of an electronic message includes various types of attachments (e.g., documents, images, etc.) in the electronic message.

Oftentimes, the sender or recipient desires to convey, share, or highlight particular information associated with the attachment or portions of the attachment. While it is common to include text along with the attachment in the electronic message, the text is included separate from the attachment and does not adequately emphasize relevant portions of the attachment. Consequently, there is a need for the sender or the recipient to be able to mark and/or annotate particular portions/sections of the attachment directly within the electronic message such that relevant portions of the attachment can be adequately emphasized.

SUMMARY

Representative embodiments set forth herein disclose various techniques for annotating and/or marking attachments in electronic messages (for example, email). In particular, the embodiments set forth various techniques for allowing a user to edit attachments included in the email. The user can edit (i.e., markup and/or annotate) the attachments directly within an email window displayed via an email client. According to one embodiment, the user can include and edit an attachment while composing a new email via the email client. In another embodiment, the user can reply to a received email that includes a received attachment. In this case, the user can edit the received attachment while replying to the email. The user can also include and edit another attachment in the reply.

To allow the user to edit the attachment (either while composing a new email or replying to a received email), the email client is configured to launch a markup application within the email window that displays the attachment. The markup application generates an editable version of the attachment within the email window. The markup application also presents a toolbar that includes multiple buttons that can be selected by the user to perform various operations (e.g., draw, add text, add arrows, etc.) on the editable version of the attachment. The markup application tracks the edits made to the attachment. When an input to close the markup application is received, the edits are applied to the attachment to generate a modified attachment within the email window. In this manner, the email client allows the user to make edits to attachments directly within the email window (i.e., without having to leave the email window).

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Typically, various organizations utilize email clients to allow users to exchange emails. An email client is an application that enables a user to receive, compose, send, and organize emails. The email client can include a native email client that is configured to run on a particular platform, such as a Mac-based email client developed for the Mac OS (operating system). Oftentimes, a user includes an attachment (for example, an image, a document, etc.) in an email and provides some information associated with the attachment in the form of text in the email. This text is provided separately (i.e., a separate area in an email window/interface) from the attachment.

As previously noted herein, the separately provided text does not adequately emphasize relevant portions of the attachment. Accordingly, the embodiments set forth herein provide various techniques for marking and/or annotating attachments directly within the email window such that relevant portions of the attachment can be adequately emphasized. In particular, the email client enables the user to edit the attachment in-place within the email window (i.e., without leaving the email).

According to one embodiment and to achieve the foregoing techniques, the email client is configured to launch a markup application within the email window that allows the user to edit the attachment displayed in the email window. The markup application generates an editable version of the attachment within the email window. The editable version of the attachment maintains the appearance (in terms of shape, size, and/or other attributes) of the original attachment and enables the user to edit the attachment in-place within the email window.

According to one embodiment, once the user has completed the edits, the markup application is closed and a modified attachment including the edits is displayed within the email window. Any edits made are stored within a metadata portion of the modified attachment. If the user chooses to make further edits to the modified attachment, the email client launches the markup application again. The markup application extracts the edits stored in the metadata and generates an editable version of the modified attachment to allow the user to make further edits. The user is allowed to make edits up until the email is sent. Prior to sending the email, the email client removes the metadata portion of the attachment.

According to another embodiment, the metadata portion of the modified attachment is encrypted by the markup application. By encrypting the metadata associated with the edits, associated information can be kept secure and protected from external entities. For example, if the user tries to send the email via a third-party mail client rather than the email client (i.e., the native email client), the encryption of the metadata is necessary because the third-party mail client does not remove the metadata portion prior to sending the email.

Accordingly, the foregoing approaches provide techniques for editing attachments within emails. A more detailed discussion of these techniques is set forth below and described in conjunction with FIGS. 1-5, which illustrate detailed diagrams of systems and methods that can be used to implement these techniques.

Figure 1:
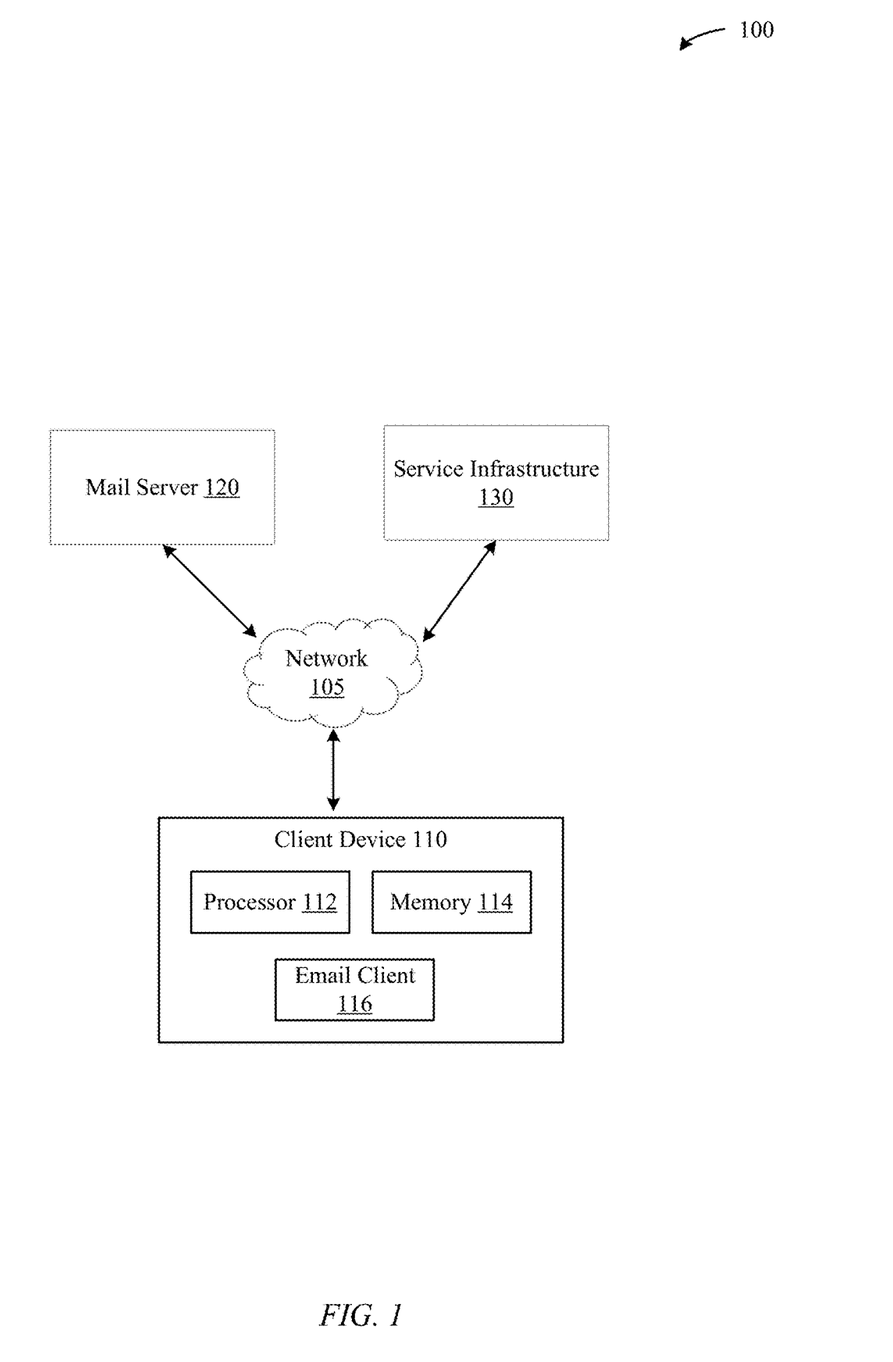
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a client device 110, a mail server 120, and a services infrastructure 130 that is configured to host and manage multiple services for an organization, for example database services, application services, and/or other business-related services. The services infrastructure 130 includes servers, databases, directories, and/or other components that work together to enable the service infrastructure 130 to locate and provide services to the client device 110 and/or applications running on the client device 110. The client device 110 is communicably coupled to the mail server 120 and the services infrastructure 130 via network 105. Network 105 can include one or more of the Internet, an intranet, a PAN (Personal Area Network), a LAN (Local Area Network), a WAN (Wide Area Network), a MAN (Metropolitan Area Network), a wireless communication network, and other network or combination of networks.

According to the illustration of FIG. 1, the client device 110 can include a processor 112, a memory 114, and an email client 116. The processor 112, in conjunction with the memory 114, is configured to execute the email client 116 and/or other applications. The client device 110 can represent a computing device, such as, a personal computer, a portable computer, a workstation, a tablet computing device, a mobile computing device, and/or other computing device. The memory 114 can include a non-transitory computer readable storage medium configured to store instructions that, when executed by the processor 112 cause the client device 110/email client 116 to carry out the various techniques set forth herein.

The email client 116 is utilized by a user of the client device 110 to receive, compose, send, and organize emails. The email client 116 communicates with the mail server 120 to send and receive emails in a known manner, as will be appreciated to those of skill in the art.

Figure 2A:
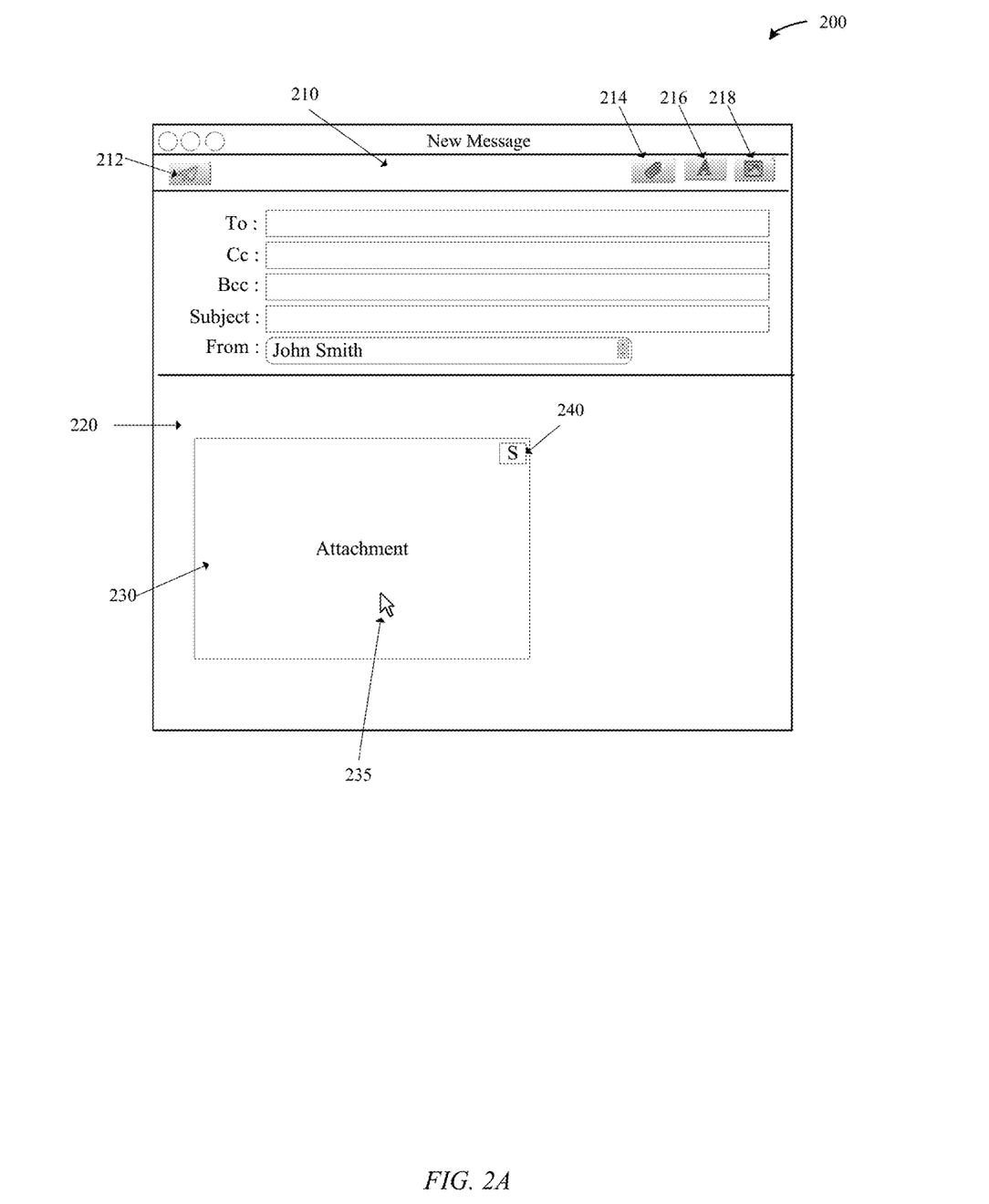
FIGS. 2A-2D illustrate conceptual diagrams of an example sequence that involves enabling a user to edit attachments directly within the email interface, according to some embodiments.

According to one embodiment, the email client 116 can be utilized by the user to compose a new email message. As will be appreciated, a user can select a "New Message" button displayed in a toolbar or press "Command-N" to open a new message window. For example, email client 116 can display a new message window 200 (as shown in FIG. 2A). The new message window 200 includes a toolbar 210. Toolbar 210 includes a send message button 212, an attach document button 214, show format bar button 216, show/hide photo browser button 218, and/or other buttons. Other buttons associated with other operations may be included in the toolbar 210. Also, other selectable graphical elements such as icons may be used instead of or in addition to the buttons 212, 214, 216, 218, as will be appreciated.

Below the toolbar 210, the new message window 200 includes a "To" field, a "Cc" field, a "Bcc" field, and a "Subject" field, as will be appreciated. Toolbar 210 further includes a "From" menu that enables the user to select a particular account from which the user desires to send the email that is being created. When the user selects the "From" menu, a number of email accounts configured with the email client 116 are displayed of which the user selects the particular desired account.

A bottom portion of the new message window 200 includes a message body 220. The user can formulate the email message within the message body 220. Typically, the user includes text, attachments, links, and/or other items within the message body 220. The user can select one or more attachments 230 (referred to hereinafter as "the attachment 230") to be included in the message body 220 by selecting the attach document button 214. In some cases, the user can drag the attachment 230 into the message body instead of or in addition to selecting the attach document button 214. The attachment 230 can be displayed directly within the message body 220. The attachment 230 can include an image, a document, and/or other type of attachment. In one embodiment, the attachment 230 includes an image in any image file format (for example, JPEG, PNG, TIFF, BMP, GIF, or other formats). In one embodiment, the attachment 230 includes a document in a portable document format (PDF).

The user can format the text in the message body 220 using different fonts, sizes, colors, and alignment by selecting the show format bar button 216. The user can select one or more images/photos to be included in the message body 220 from a personal photo library by selecting the show/hide photo browser button 218.

According to one embodiment, once the attachment 230 is included in the message body 220, a user may edit the attachment 230 directly within the message body 220. The email client 116 detects the attachment 230 within the message body 220. The email client 116 determines a type of the attachment 230. For example, the email client 116 may determine that the attachment 230 is an image (of a particular format) or a PDF document.

Upon selection of the attachment 230, email client 116 displays an icon 240 around the top-right corner of the attachment 230. The icon 240 and the placement of the icon 240 on attachment 230 is exemplary, and other graphical elements and placements can be utilized without departing from the scope of this disclosure. In one embodiment, the user may select the attachment 230 by moving the pointer 235 over the attachment 230. In other words, movement of the pointer 235 over the attachment 230 causes the email client 116 to display the icon 240.

Figure 2B:
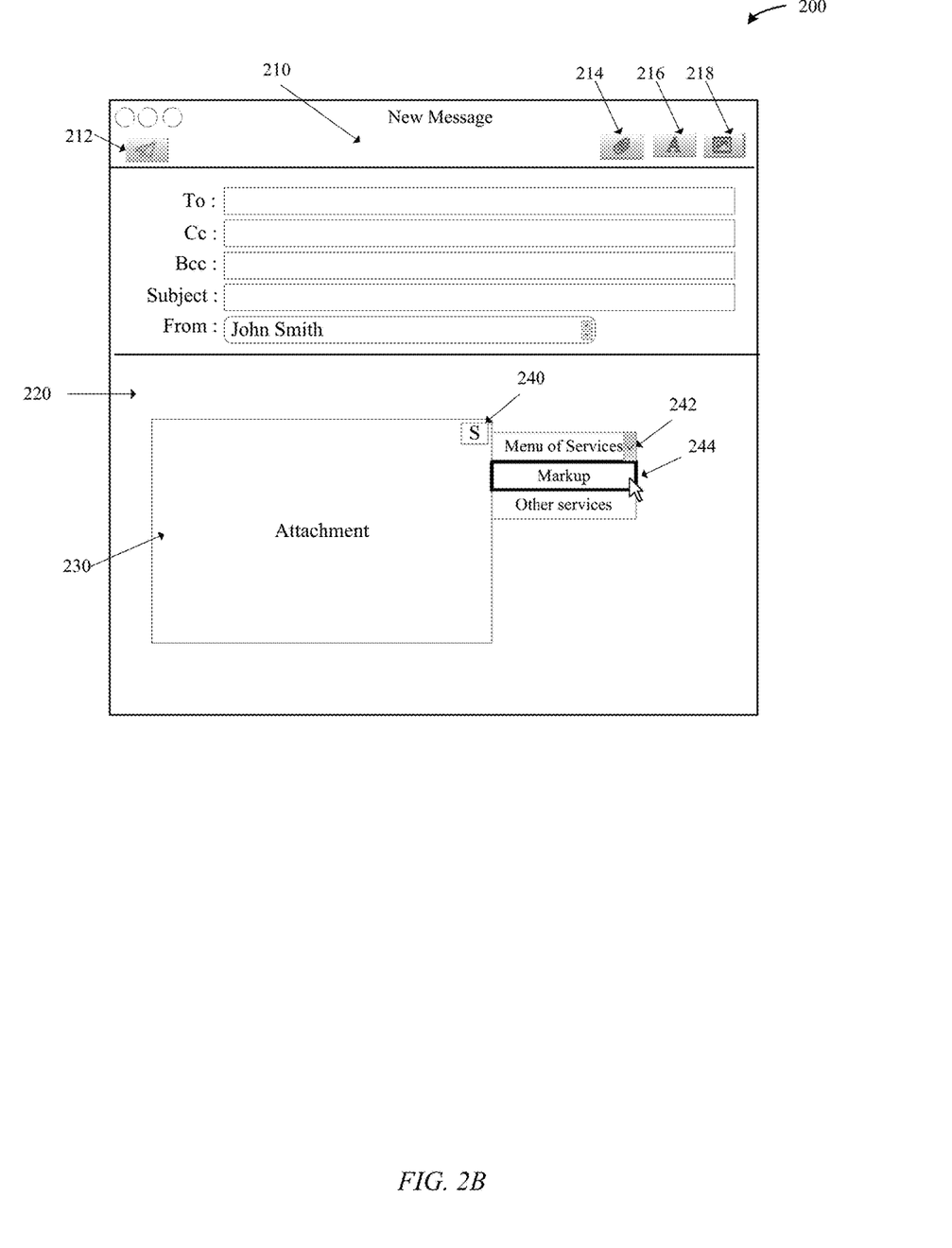

Selection of icon 240 causes the email client 116 to display a menu of services 242, as shown in FIG. 2B. The user may select the icon 240 by clicking the icon 240, as will be appreciated. According to one embodiment, in response to the user selection of icon 240, email client 116 generates a request for services. The email client 116 communicates the request to the services infrastructure 130. The request includes the type of the attachment 230. In response to the request, the services infrastructure 130 identifies services for the attachment 230 based on the type of the attachment 230 included in the request. The services infrastructure 130 identifies services that can allow one or more actions to be performed on the attachment 230. For example, a markup service 244 can allow edits to be performed on the attachment 230. The services infrastructure 130 communicates a list of identified services to the email client 116.

Email client 116 displays the list of identified services received from the services infrastructure 130 in the menu of services 242. A user can select the markup service 244 as shown in FIG. 2B. Selection of the markup service 244 causes the email client 116 to launch a markup application associated with the markup service 244. The markup application is launched within the message body 220 and allows the user to edit the attachment 230 directly within the message body 220. In one implementation, the email client 116 launches the markup application by calling appropriate APIs (Application Programming Interfaces) associated with the markup service 244.

Figure 2C:
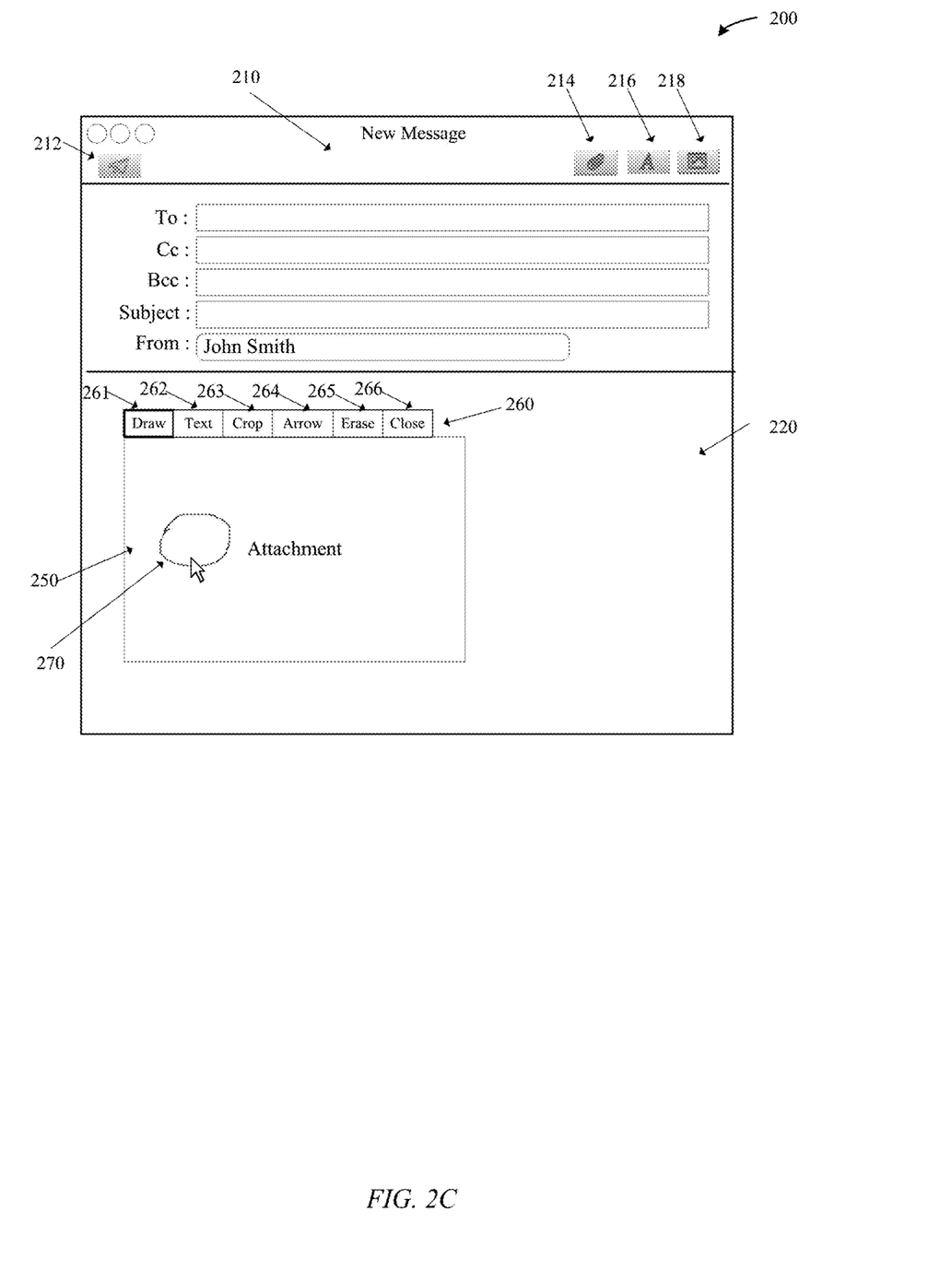

According to one embodiment, the markup application generates an editable version of the attachment 250 (referred to hereinafter as "editable version" 250) within the message body 220, as shown in FIG. 2C. The editable version 250 maintains the appearance of the original attachment 230 and enables the user to edit the attachment in-place within the message body 220 (i.e., without leaving the new message window 200). In other words, the editable version 250 is of substantially the same shape and size as the original attachment 230 and is located at substantially the same position as the original attachment 230 within the message body 220. According to one embodiment, the original attachment 230 remains attached to the email and the editable version 250 overlays the original attachment 230. In one implementation, the attachment is 230 is passed to the markup service 244 which enables the markup application to generate the editable version 250.

In addition to the editable version 250, the markup application displays a toolbar 260 that includes a number of buttons 261, 262, 263, 264, 265, 266. Each of these buttons 261, 262, 263, 264, 265, 266 can be selected by the user to perform various operations on the editable version 250. For example, button 261 can be selected to draw on the editable version 250, button 262 can be selected to add text to the editable version 250, button 263 can be selected to crop a portion of the editable version 250, button 264 can be selected to add arrows/pointers to a portion of the editable version 250, button 265 can be selected to erase a portion of the drawing/text added to the editable version 250, and button 266 can be selected to close the markup application. The user may select one or more of the buttons 261, 262, 263, 264, 265, 266 to markup and/or annotate the editable version 250. Other buttons associated with other operations may be included in the toolbar 260. Also, other selectable graphical elements such as icons may be used instead of or in addition to the buttons 261, 262, 263, 264, 265, 266, as will be appreciated.

Figure 2D:
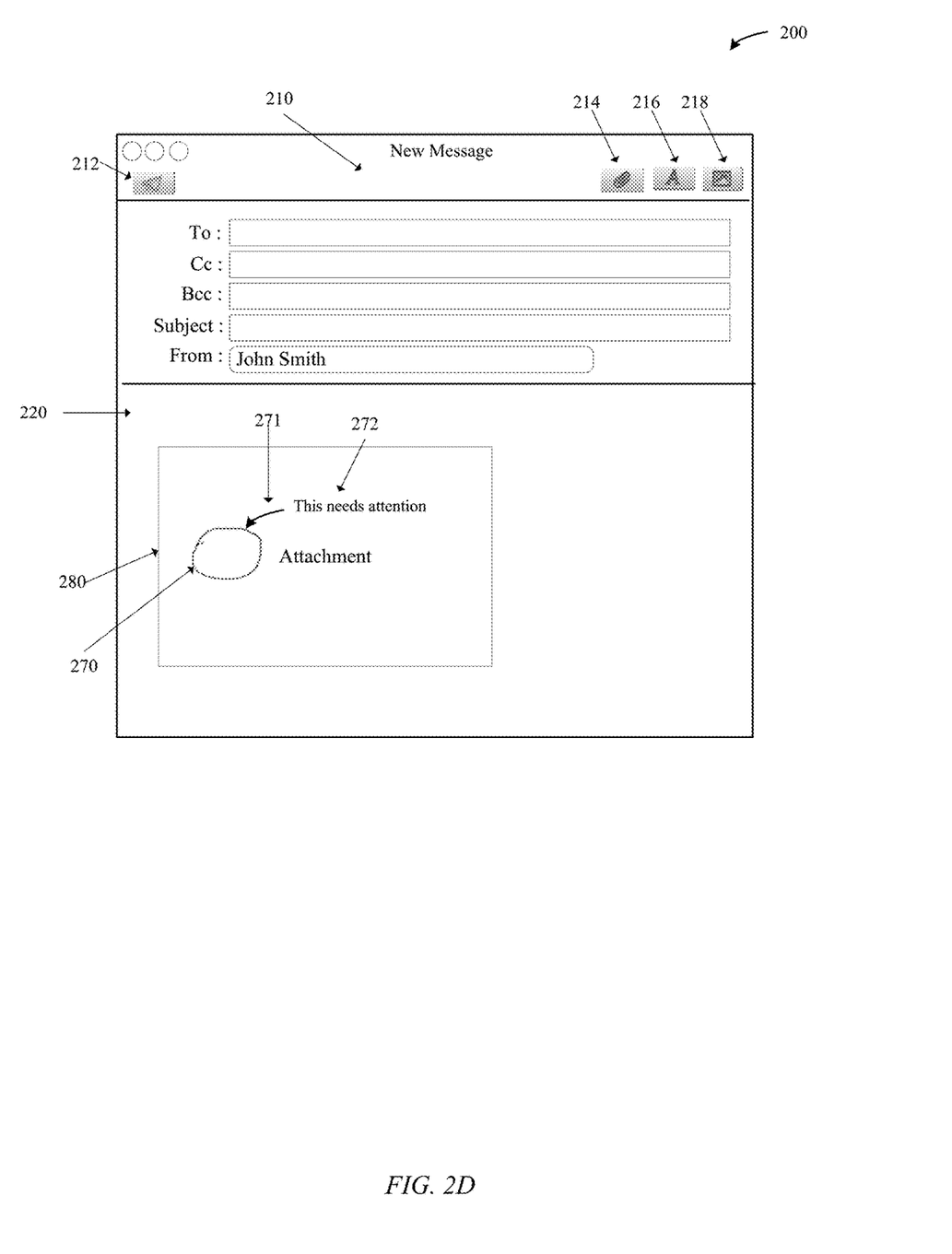

FIG. 2C illustrates that the user has selected button 261 which allows the user to create a drawing 270 on the editable version 250. Various edits (in the form of markups, annotations, etc.) can be made to the same editable version 250 and the edits are tracked by the markup application. Once the user has completed making the edits, the user selects the button 266 to close the markup application. Prior to closing the markup application, the edits are applied to the original attachment 230 to generate a modified attachment 280 (shown in FIG. 2D). The edits can be applied by the markup application or the email client 116. For example, as illustrated in FIG. 2D, the modified attachment 280 within the message body includes the drawing 270 and other edits such as arrow 271 and text 272 added to the attachment. In this manner, the original attachment 230 can be marked-up and annotated within the message body 220 without having to leave the new message window 200.

For example, the attachment 230 can include an image (e.g., a raster image) which is edited by the markup application to generate a modified image. The image is edited by manipulating the pixels of the image. The edits (for example, drawing 270) made to the modified image can be burnt into the image in terms of pixels. However, if the user were to launch the markup application again to make any changes to the edits or make new edits to the image, the markup application allows the user to make changes to the edits as though the edits were not burnt into the image. This is made possible by storing edit data (i.e., data associated with the edits) in a metadata portion of the modified image. In one embodiment, when the attachment 230 includes a PDF document, the markup application also supports standard annotations provided by the PDF file format.

According to an embodiment, the original attachment 230 includes original metadata associated with the original attachment 230. For an image, the metadata can include information such as image size, image resolution, date of creation, and/or other information. For a document, the metadata can include information such as, document size, author of document, date of creation, summary of document, and/or other information. Once edits are made and the markup application is closed, the markup application can add the edit data to a metadata portion of the modified attachment. Thus, the metadata portion of the modified attachment 280 includes the original metadata and edit data associated with the edits. For example, when the attachment is an image, the modified image includes the original image and edits and the metadata portion of the modified image includes the original image metadata and the edit data.

If the user chooses to make further edits to the modified attachment 280, the user can move the pointer over the modified attachment 280, select icon 240, select markup service 244 and the markup application can be launched again in a manner similar to that described in FIGS. 2A-2D. According to one embodiment, the markup application extracts the edit data from the metadata portion of the modified attachment 280. In other words, the markup application can separate (pull apart) the edit data from the attachment. Based on the extracted edit data, the markup application generates an editable version of the modified attachment 280 to allow the user to continue editing or make further edits (i.e., make changes to the previously made edits or add new edits). For example, the markup application may extract edit data associated with drawing 270, arrow 271, and text 272, such that the user is allowed to make further changes to the drawing 270, arrow 271, and text 272.

Once the user has completed composing the email and editing the attachment, the user can select the send button 212 to send the email. Prior to sending the email, the email client 116 removes the metadata portion of the modified attachment 280. The email client 116 can remove the edits from the metadata by calling appropriate APIs (application programming interfaces). A recipient of the email is capable of viewing the modified attachment 280 (with the edits) using any application or on any platform. In other words, the modified attachment 280 is application and platform independent.

According to another embodiment, the metadata portion of the modified attachment 280 is encrypted by the markup application. When the email client 116 (which is the native email client) is used to send the email with the modified attachment 280, the email client 116 can remove the metadata portion from the modified attachment (i.e., the metadata portion is completely stripped out from the modified attachment 280 prior to sending the email). However, when a user uses a third-party mail client (for example, a web-based mail client or other non-native email client) to send the email with the modified attachment 280, the metadata portion (including the edit data) needs to be kept secure and protected from external entities by encrypting the metadata portion. This is because the third-party mail client does not remove the metadata portion of the modified attachment 280 prior to sending the email. For example, a user may have edited a legal document within the email by cropping a section of the legal document (i.e., removing a portion of the legal document). The edit data associated with the edits made to the legal document is included in the metadata portion of the legal document. If the third-party mail client is used to send out the email, the metadata portion of the legal document needs to be encrypted to avoid this information from being exposed to malicious entities.

In an exemplary scenario, the user may use the email client 116 (native email client) to compose an email with the attachment 230 and make edits to the attachment 230 within the email. While the user is using the email client 116, the user can keep making edits to the attachment 230. When the user is done making the edits, the modified attachment 280 is displayed within the email and the user may choose to save the email as a draft. Thereafter, the user may open the email with the modified attachment 280 via the third-party mail client. The user can simply view the modified attachment 280 via the third-party mail client but cannot make any edits to the modified attachment 280. For example, in the case of the raster image, the user can view the edits burnt into the image but cannot make any further changes to the image. If the user sends the email via the third-party mail client, the metadata (or edit data) is not compromised because it is encrypted.

According to one embodiment, the user can edit attachments while replying to an email received from another user. For example, the email received from the other user can include an attachment. The user can select a reply button (not illustrated in the FIGs) to reply to a received email that includes a received attachment. In this case, the user can edit the received attachment within the message body of the reply in a manner similar to that described in FIGS. 2A-2D. The user can also include and edit another attachment in the reply. In an exemplary scenario, the user may receive an email including a document/form that requires a signature of the user and/or some portions filled out. When the user selects the reply button, a reply message window opens which includes the document/form within the message body of the reply. The user can edit the document within the message body by adding the signature or adding text to filling out portions in the document. The user can then send the reply that includes edited document.

According to one embodiment, the user may utilize multiple client devices to edit the original attachment 230. For instance, though FIG. 1 depicts a single client device 110, the system 100 can include a number of client devices associated with the user without departing from the scope of the disclosure. Each client device can include a keychain password management system that stores a keychain (e.g., passwords and other sensitive data) for the user and/or the client device. When the user tries to login to the email client via any of the client devices (by supplying a user id), the keychain is used to identify the user, obtain a password for the user and log the user in. In some implementations, the keychain is used to identify all the client devices associated with the user. Thus, a user may 1) login to a first email client at a first client device, 2) edit the attachment 230 in an email via the first email client, and 3) save the email. At a later time, the user may login to a second email client at a second client device and may continue editing the attachment 230 via the second email client as the user id and the client devices are recognized as belonging to the same user based on the keychain.

While the techniques for editing attachments have been described in terms annotating and/or marking attachments included in an email message, the techniques can be applied to attachments included in other types of electronic messages as well without departing from the scope of this disclosure.

Figure 3:
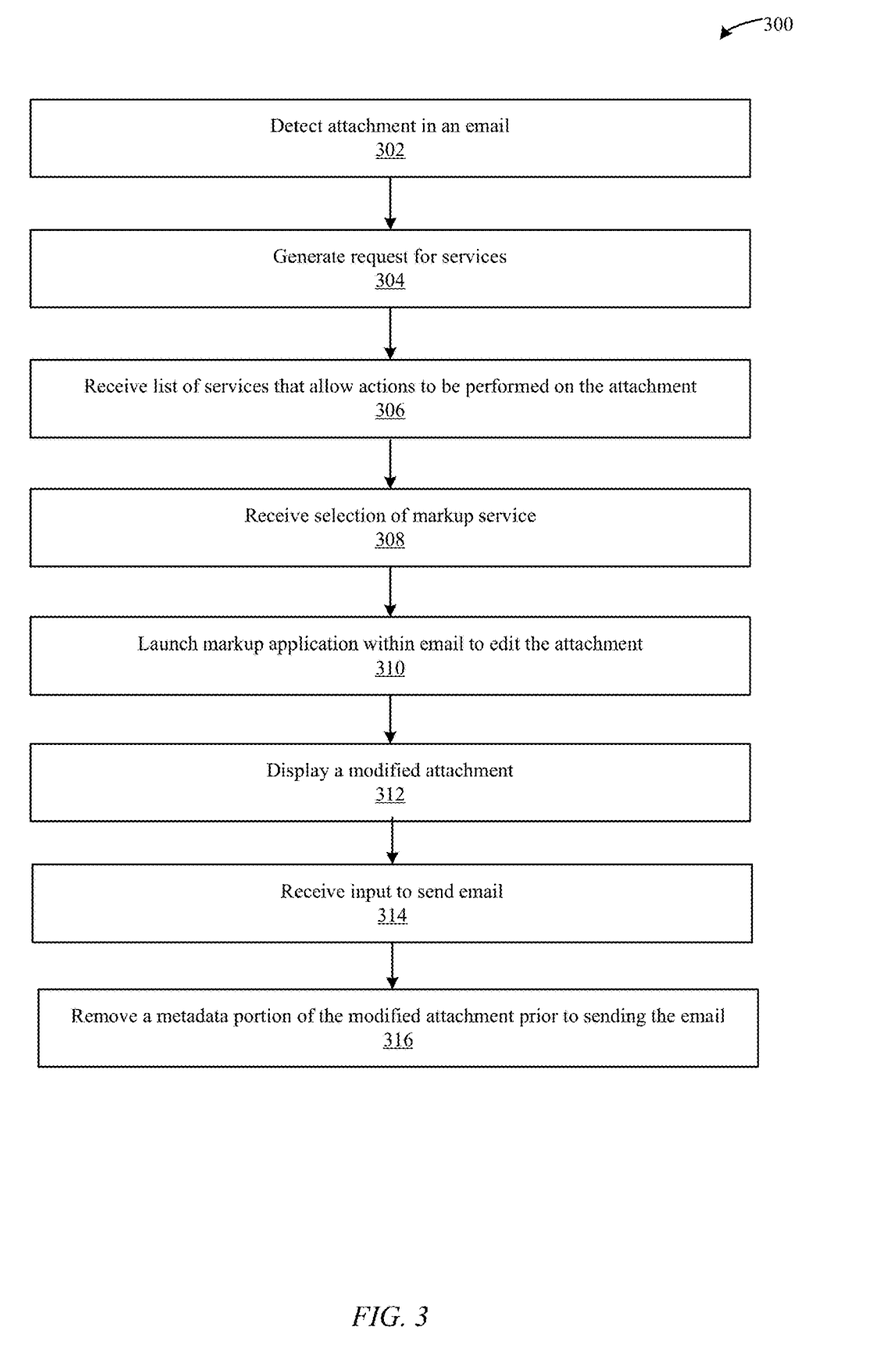
FIG. 3 illustrates a method that is carried out by an email client of the client device of FIG. 1, according to one embodiment.

FIG. 3 illustrates a method 300 that is carried out by the email client 116 of FIG. 1, according to one embodiment. As shown, the method 300 begins at step 302, where the email client 116 detects an attachment (e.g., attachment 230) in an email. In one embodiment, the email client 116 can determine a type and/or format of the attachment 230, for example, an image (in a particular format), a PDF document, etc.

At step 304, the email client 116 generates a request for services for the attachment 230. The request is communicated to services infrastructure 130 and includes the type and/or format of the attachment 230. The request is generated in response to a user selection of an icon (for example icon 240) displayed on the attachment 230. At step 306, the email client 116 receives a list of services (including a markup service) associated with the attachment 230 from the services infrastructure 130. The received services can allow actions (for example, markup) to be performed on the attachment 230. The email client 116 displays the received list of services in a menu (for example, menu 242).

At step 308, the email client 116 receives a selection of the markup service (example, markup service 244). At step 310, the email client 116 launches a markup application associated with the markup service 244. The markup application is launched within the email and allows the user to edit the attachment directly within the email. The markup application generates an editable version of the attachment within the email (for example, editable version 250). Along with the editable version 250, the markup application displays a toolbar 260 with a number of buttons 261, 262, 263, 264, 265 that can be selected by the user to perform various operations (e.g., draw, add text, add arrows, etc.) on the editable version 250. Once the user has completed the edits, the edits are applied to the attachment 230 to generate a modified attachment (for example, modified attachment 280) and the edits are stored in the metadata portion of the modified attachment 280.

At step 312, email client 116 displays the modified attachment 280. At step 314, the email client 116 receives an input to send the email (by clicking the send button 212, for example). Prior to sending the email, the email client 116 removes the metadata portion of the modified attachment, at step 316.

Figure 4:
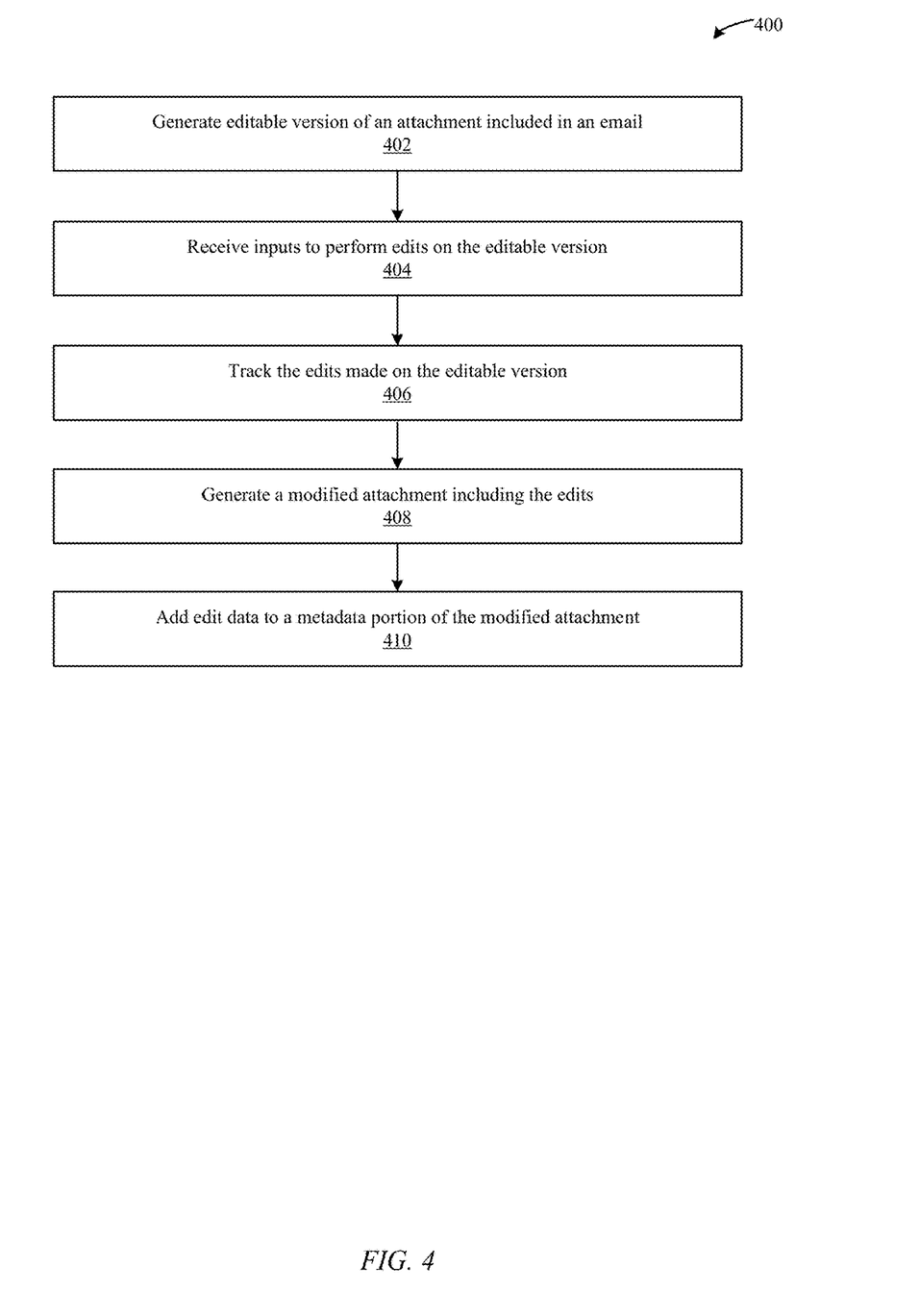
FIG. 4 illustrates a method that is carried out by a markup application launched by the email client, according to one embodiment.

FIG. 4 illustrates a method carried out by the markup application, according to one embodiment. At step 402, the markup application that is launched by the email client 116 generates an editable version of an attachment 230 (for example, editable version 250) included in an email. At step 404, the markup application may receive inputs to perform various edits (e.g., add drawing, add text, add arrows, etc.) in the editable version. For example the markup application may receive inputs in the form of selection of buttons 261, 262, 263, 264, 265.

At step 406, the markup application tracks the edits as they are made to the attachment. At step 408, the markup application generates a modified attachment 280 that includes the edits. The markup application may apply the edits to the attachment 230 to generate the modified attachment 280. At step 410, the markup application adds edit data associated with the edits to a metadata portion of the modified attachment. According to one embodiment, steps 408 and 410 are performed when a user input to close the markup application is received. In one embodiment, the markup application can encrypt the metadata portion of the modified attachment.

Figure 5:
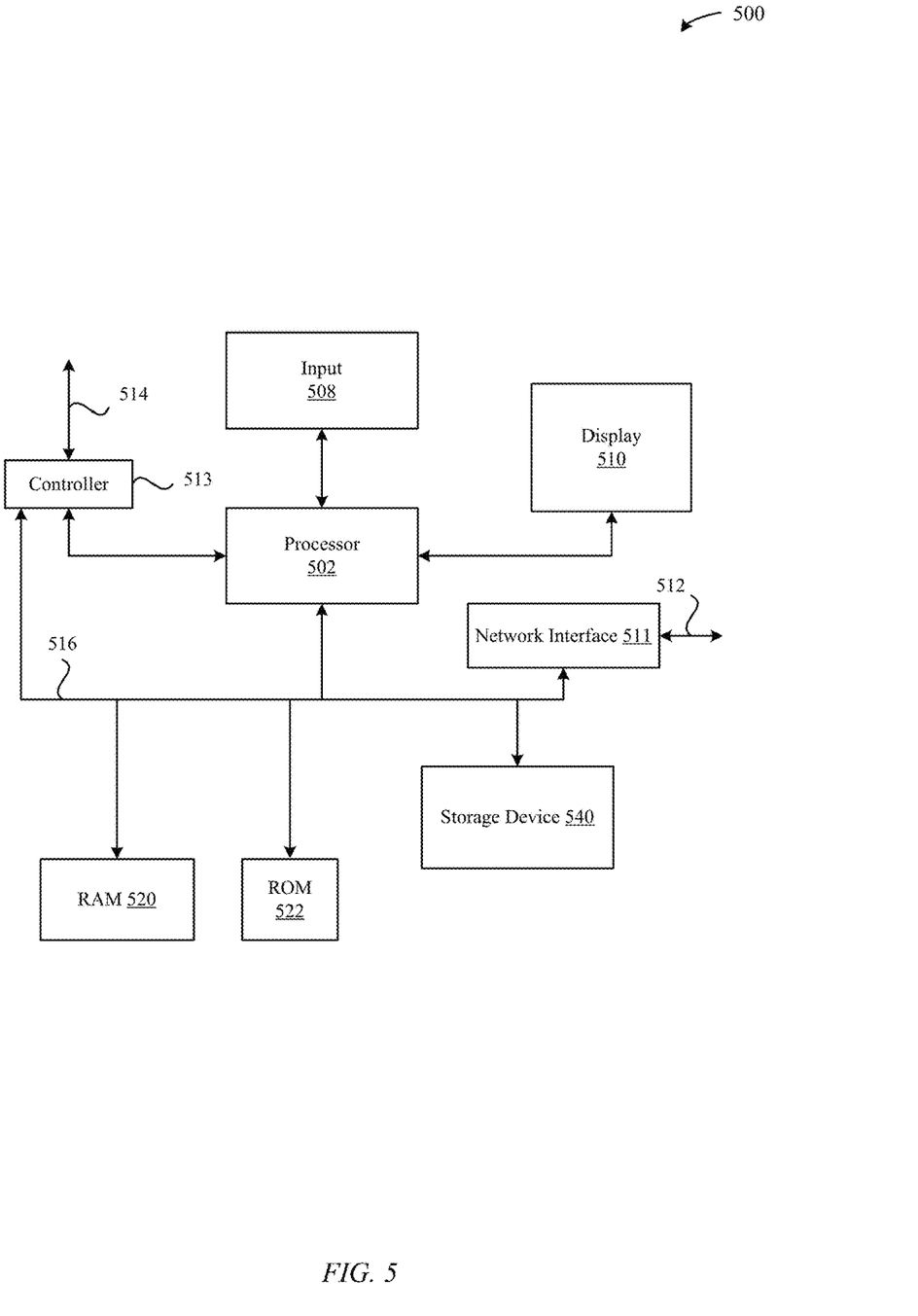
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the client device 112 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user (for example, email interface described herein). A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling email attachments to be edited, the method comprising, at an email application executing on a computing device:

receiving a first selection to edit an original version of an attachment associated with an email message;

in response to the first selection, generating a new email message that includes an updated version of the attachment;

launching a markup service that graphically appends, within a body of the new email message, a set of selectable editing options that enable edits to be made to the updated version of the attachment within the body of the new email message, wherein the markup service is associated with a services infrastructure that is external to the email application;

applying the edits to the updated version of the attachment; and in response to receiving a second selection to send the new email message:

sending the new email message and the updated version of the attachment.

2. The method of claim 1, wherein:
the updated version of the attachment is associated with original metadata that is associated with the original version of the attachment,
applying the edits to the updated version of the attachment comprises storing the edits into new metadata associated with the updated version of the attachment, and
the method further comprises, in response to receiving the second selection to send the new email message:
removing the new metadata from the updated version of the attachment while retaining the original metadata.

3. The method of claim 2, further comprising, prior to removing the new metadata from the updated version of the attachment:
encrypting the new metadata while leaving the original metadata in a plaintext form.

4. The method of claim 1, further comprising, in response to the first selection:
generating a request for a plurality of services associated with the original version of the attachment, wherein:
the request indicates a type of the original version of the attachment, and
the request is addressed to the services infrastructure, which is communicably coupled to the computing device via a network;
issuing the request to the services infrastructure, wherein the services infrastructure utilizes the type of the original version of the attachment to identify the plurality of services associated with the original version of the attachment;
receiving, from the services infrastructure, the plurality of services associated with the original version of the attachment, wherein the plurality of services includes the markup service;
displaying the plurality of services within the body of the new email message.

5. The method of claim 1, wherein the edits are applied to the updated version of the attachment in response to receiving a third selection to close the markup service.

6. The method of claim 1, wherein the updated version of the attachment is positioned within the body of the new email message in accordance with a position of the original version of the attachment within the body of the email message.

7. A computing device configured to enable email attachments to be edited, the computing device comprising:
at least one processor; and
at least one memory configured to store instructions that, when executed by the at least one processor, cause the computing device to execute an email application configured to:
receive a first selection to edit an original version of an attachment associated with an email message;
in response to the first selection, generate a new email message that includes an updated version of the attachment;
launch a markup service that graphically appends, within a body of the new email message, a set of selectable editing options that enable edits to be made to the updated version of the attachment within the body of the new email message, wherein the markup service is associated with a services infrastructure that is external to the email application;
apply the edits to the updated version of the attachment; and in response to receiving a second selection to send the new email message:
send the new email message and the updated version of the attachment.

8. The computing device of claim 7, wherein:
the updated version of the attachment is associated with original metadata that is associated with the original version of the attachment,
applying the edits to the updated version of the attachment comprises storing the edits into new metadata associated with the updated version of the attachment, and
the at least one processor further causes the computing device to, in response to receiving the second selection to send the new email message:
remove the new metadata from the updated version of the attachment while retaining the original metadata.

9. The computing device of claim 8, wherein the at least one processor further causes the computing device to, prior to removing the new metadata from the updated version of the attachment:
encrypt the new metadata while leaving the original metadata in a plaintext form.

10. The computing device of claim 7, wherein the at least one processor further causes the computing device to, in response to the first selection:
generate a request for a plurality of services associated with the original version of the attachment, wherein:
the request indicates a type of the original version of the attachment, and
the request is addressed to the services infrastructure, which is communicably coupled to the computing device via a network;
issue the request to the services infrastructure, wherein the services infrastructure utilizes the type of the original version of the attachment to identify the plurality of services associated with the original version of the attachment;
receive, from the services infrastructure, the plurality of services associated with the original version of the attachment, wherein the plurality of services includes the markup service;
display the plurality of services within the body of the new email message.

11. The computing device of claim 7, wherein the edits are applied to the updated version of the attachment in response to receiving a third selection to close the markup service.

12. The computing device of claim 7, wherein the updated version of the attachment is positioned within the body of the new email message in accordance with a position of the original version of the attachment within the body of the email message.

13. The computing device of claim 7, wherein the computing device is associated with account credentials that enable the new email message and the updated version of the attachment to be accessed and further-modified using a second computing device that is distinct from the computing device and is associated with the account credentials.

14. At least one non-transitory computer readable storage medium configured to store instructions that, when executed by at least one processor included in a computing device, cause an email application of the computing device enable email attachments to be edited, by carrying out steps that include:
receiving a first selection to edit an original version of an attachment associated with an email message;
in response to the first selection, new email message that includes an updated version of the attachment;

launching a markup service that graphically appends, within a body of the new email message, a set of selectable editing options that enable edits to be made to the updated version of the attachment within the body of the new email message, wherein the markup service is associated with a services infrastructure that is external to the email application;

applying the edits to the updated version of the attachment; and in response to receiving a second selection to send the new email message:

sending the new email message and the updated version of the attachment.

15. The at least one non-transitory computer readable storage medium of claim 14, wherein:

the updated version of the attachment is associated with original metadata that is associated with the original version of the attachment, applying the edits to the updated version of the attachment comprises storing the edits into new metadata associated with the updated version of the attachment, and the steps further include, in response to receiving the second selection to send the new email message:

removing the new metadata from the updated version of the attachment while retaining the original metadata.

16. The at least one non-transitory computer readable storage medium of claim 15, wherein the steps further include, prior to removing the new metadata from the updated version of the attachment:

encrypting the new metadata while leaving the original metadata in a plaintext form.

17. The at least one non-transitory computer readable storage medium of claim 14, wherein the steps further include, in response to the first selection:

generating a request for a plurality of services associated with the original version of the attachment, wherein:

the request indicates a type of the original version of the attachment, and the request is addressed to the services infrastructure, which is communicably coupled to the computing device via a network;

issuing the request to the services infrastructure, wherein the services infrastructure utilizes the type of the original version of the attachment to identify the plurality of services associated with the original version of the attachment;

receiving, from the services infrastructure, the plurality of services associated with the original version of the attachment, wherein the plurality of services includes the markup service;

displaying the plurality of services within the body of the new email message.

18. The at least one non-transitory computer readable storage medium of claim 14, wherein the edits are applied to the updated version of the attachment in response to receiving a third selection to close the markup service.

19. The method of claim 1, wherein the computing device is associated with account credentials that enable the new email message and the updated version of the attachment to be accessed and further-modified using a second computing device that is distinct from the computing device and is associated with the account credentials.

20. The at least one non-transitory computer readable storage medium of claim 14, wherein the computing device is associated with account credentials that enable the new email message and the updated version of the attachment to be accessed and further-modified using a second computing device that is distinct from the computing device and is associated with the account credentials.

* * * * *

UNITED STATES PATENT AND TRADEMARK OFFICE
CERTIFICATE OF CORRECTION

PATENT NO.        : 10,162,807 B2
APPLICATION NO.   : 14/291956
DATED             : December 25, 2018
INVENTOR(S)       : Carlen et al.

Page 1 of 1

It is certified that error appears in the above-identified patent and that said Letters Patent is hereby corrected as shown below:

In the Claims

In Claim 14, at Column 12, Line 61: "computing device enable" should read -- computing device to enable --.

In Claim 14, at Column 12, Line 66: "selection, new email" should read -- selection, generating a new email --.

Signed and Sealed this
Twenty-sixth Day of November, 2019

Andrei Iancu
*Director of the United States Patent and Trademark Office*